United States Patent
Nakashima

(10) Patent No.: US 7,826,281 B2
(45) Date of Patent: Nov. 2, 2010

(54) MEMORY READ CONTROL CIRCUIT

(75) Inventor: Hidemi Nakashima, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 203 days.

(21) Appl. No.: 12/219,521

(22) Filed: Jul. 23, 2008

(65) Prior Publication Data
US 2009/0034346 A1 Feb. 5, 2009

(30) Foreign Application Priority Data
Jul. 31, 2007 (JP) .............................. 2007-198753

(51) Int. Cl.
*G11C 7/22* (2006.01)
(52) U.S. Cl. .................. 365/189.15; 365/191; 365/193; 365/194; 365/233.1
(58) Field of Classification Search ............ 365/189.15, 365/191, 193, 194, 233.1
See application file for complete search history.

(56) References Cited

U.S. PATENT DOCUMENTS

| | | | |
|---|---|---|---|
| 6,680,869 B2 * | 1/2004 | Sonoda et al. ......... | 365/189.05 |
| 6,795,906 B2 * | 9/2004 | Matsuda ................ | 711/167 |
| 6,807,613 B1 * | 10/2004 | Keeth et al. ............ | 711/167 |
| 6,918,016 B1 * | 7/2005 | Magro .................. | 711/154 |
| 7,038,953 B2 * | 5/2006 | Aoki ..................... | 365/189.05 |
| 7,042,799 B2 * | 5/2006 | Cho ..................... | 365/185.17 |
| 7,266,022 B2 * | 9/2007 | Aoki ..................... | 365/189.05 |
| 7,480,197 B2 * | 1/2009 | Carnevale et al. ...... | 365/201 |
| 2005/0213396 A1 | 9/2005 | Aoki | |
| 2006/0221088 A1 | 10/2006 | Aoki | |

FOREIGN PATENT DOCUMENTS

| | | |
|---|---|---|
| JP | 2005-276396 | 10/2005 |
| JP | 2006-260322 | 9/2006 |

* cited by examiner

*Primary Examiner*—Viet Q Nguyen
(74) *Attorney, Agent, or Firm*—McGinn IP Law Group, PLLC

(57) ABSTRACT

A DQS detection circuit 13 detects a preamble of a DQS signal outputted from RAM 11. An up/down counter 14 counts up a number of clock signals CLK) in a period when an DQSEIN signal showing a continuation length of the DQS signal is active, counts down a number of trailing edges of the DQS signal after the preamble corresponding to a data read request, and detects that a counted value is set to 0. A flip-flop circuit FF2 makes a mask signal MS) a low level when the counted value is set to 0. An AND circuit AND2 makes the DQS signal maskable with a mask signal MS.

5 Claims, 4 Drawing Sheets

MEMORY READ CONTROL CIRCUIT

BACKGROUND OF THE INVENTION

1. Field of the Invention

The present invention relates to a memory read control circuit, and in particular, to a read control circuit for reading data from DDR SDRAM (Double Data Rate Synchronous Dynamic Random Access Memory).

2. Description of the Related Art

With rapid progress of an IT (Information Technology) technique, a transmission rate of data communicated on a transmission line has increasingly become in high speed. For the reason, an electrical circuit mounted in an apparatus connected to a transmission line is required to have a function of performing high speed processing in a large scale, and circuitry using DDR SDRAM is performed frequently.

In order to notify a receiver of timing of transferring data, DDR SDRAM uses a data strobe signal (DQS). The DQS is a bidirectional strobe signal and functions as an operation reference clock of a data input/output at the time of a read/write operation. In read operation, since an edge of the DQS and an edge of read data coincide, when read data is received from the DDR SDRAM, the received DQS is delayed inside to a center of the read data.

When a read command (READ) is received when the DDR SDRAM is in an active state, the DQS changes from a high impedance (Hi-Z) state to a low level. This low level period is a preamble. The preamble is generated about 1 clock before a first data is outputted. With following the preamble, the DQS is toggled at the same frequency as a clock signal in a period equivalent to a burst length when valid data is on a data input/output terminal (DQ). The low level period after last data is transferred is a postamble. The postamble is generated for about ½ clocks from an edge of the last data.

The DQS transits from the high impedance state to a preamble, and shifts to a high impedance state from the postamble. When an intermediate level in this high impedance state becomes a signal of an undefined level and spreads inside a memory interface, there is a possibility that read data in a data incorporation unit may be destroyed before read data is latched by a data synchronizer. Then, in order to avoid such data becoming unfixed, a DQS mask circuit for keeping an undefined level from spreading to an input side of the DQS is mounted in a circuit in a memory read side (e.g., patent documents 1 and 2: Japanese Patent Laid-Open Nos. 2005-276396 and 2006-260322).

A memory interface control circuit equipped with such a DQS mask circuit can improve glitch noise resistance of read-out data and can relax restrictions of physical arrangement relationship between memory and a memory controller LSI, at the time of transfer of read-out data between the memory and memory controller LSI.

In the present invention, the following analyses are performed.

Patent documents 1 and 2 disclose interface control circuits which are excellent in glitch noise resistance regarding a data strobe signal to data which is burst transferred with corresponding to a read command. Specifically, examples in cases that a burst transfer with a read command is 4 or 8 are mentioned. However, when it is going to give further flexibility, for example, when a burst transfer is 1 and this is made to be applied to continuous read commands, it becomes necessary to perform a redesign of a circuit with corresponding to a transfer mode. That is, a customized design according to each product is required, and hence, flexibility is lost.

SUMMARY OF THE INVENTION

A memory read control circuit according to one aspect of the present invention comprises a data strobe detection circuit which detects a preamble of a data strobe signal outputted from memory, a mask circuit which makes the data strobe signal maskable with a mask signal, and a mask control circuit which inputs information on a data read number relating to a data read request to the memory, decides on the basis of the information on the data read number that the data strobe signal repeated a predetermined number of transitions after the preamble, and performs control to make the mask signal into a masked state.

The present invention makes a mask signal into a masked state by deciding on the basis of information on a data read number that a data strobe signal repeated predetermined number of transitions. Hence, the data strobe signal is not based on a data read number, but mask control is performed stably. As a result, circuitry which makes the customization design according to each product unnecessary, and gives flexibility becomes possible.

DETAILED DESCRIPTION OF THE PREFERRED EMBODIMENTS

A memory read control circuit according to an embodiment of the present invention comprises a data strobe detection circuit, a mask circuit, and a mask control circuit. The data strobe detection circuit detects a preamble of a data strobe signal outputted from memory. The mask circuit makes the data strobe signal maskable with a mask signal. The mask control circuit inputs information on a data read number relating to a data read request to the memory, decides on the basis of the information on the data read number that the data strobe signal repeated a predetermined number of transitions after the preamble, and performs control to make the mask signal into a masked state.

In addition, the mask control circuit may perform control so as to make the mask signal into a masked state on the basis of the data read number coinciding with an edge number of one side of the data strobe signal corresponding to the data read request.

Here, the data read number may be a read command number.

In addition, the mask control circuit may include an up/down counter which counts up or counts down the data read number, and counts down or count up the edge number of one side of the data strobe signal corresponding to the data read request, detects coincidence of the data read number with the edge number of the one side, and perform control so as to make the mask signal into a masked state on the basis of a detection result of the up/down counter.

The up/down counter may count up or count down a clock number in a period, when a signal which expresses a continuation length of the data strobe signal is active, instead of counting up or counting down the data read number.

When the data strobe detection circuit inputs a sampling clock signal and counts a preamble period of the data strobe signal with the sampling clock signal, and a count value becomes a specified value, the data strobe detection circuit may start counting of an edge of one side of the data strobe signal in the mask control circuit.

According to the above memory read control circuit, by operating the DQS mask circuit using the up/down counter and DQS detection circuit, the customized design according to a product is not needed, but it is possible to use the circuitry of giving flexibility.

Hereinafter, in conformity with embodiments, the present invention will be described in detail with referring to drawings.

Embodiment 1

Figure 1:
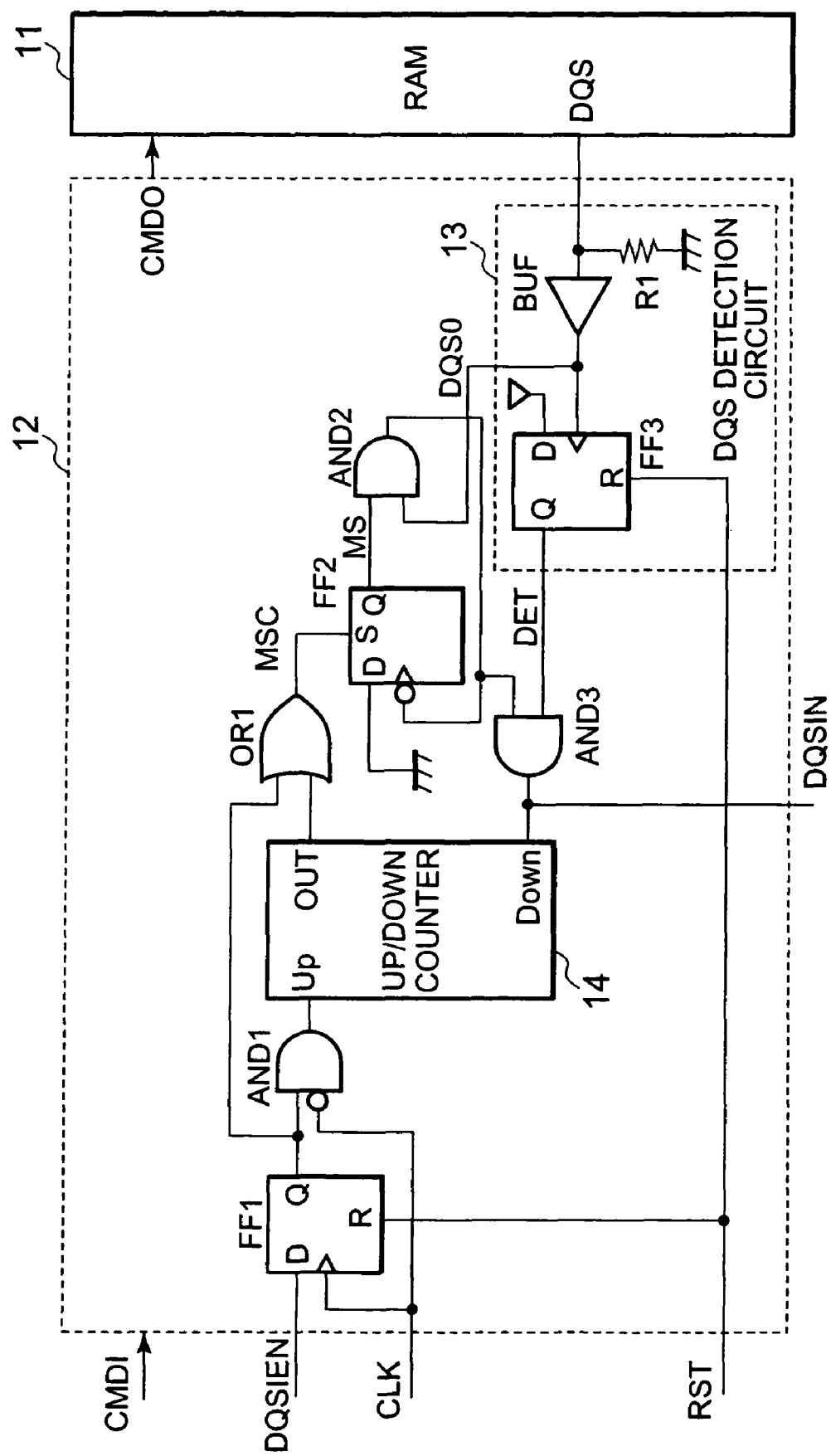
FIG. 1 is a block diagram showing construction of a memory read control circuit according to a first embodiment of the present invention.

FIG. 1 is a block diagram showing construction of a memory read control circuit according to a first embodiment of the present invention. In FIG. 1, a memory read control circuit 12 comprises a DQS detection circuit 13, an up/down counter 14, flip-flop circuits FF1 and FF2, AND circuits AND1, AND2 and AND3, and an OR circuit OR1. The DQS detection circuit 13 comprises a flip-flop circuit FF3, a buffer circuit BUF, and a resistance element R1.

The memory read control circuit 12 inputs a command signal CMDI according to a read request given from the external, and outputs it to RAM11 as a command signal CMDO. In addition, the memory read control circuit 12 inputs read data, which is not shown, and a DQS signal showing timing of the read data corresponding to the command signal CMDO from the RAM11.

The flip-flop circuit FF1 inputs a signal DQSIEN, which shows a length of a DQS signal, from a user circuit which is not shown, and performs retiming with a clock signal CLK. The AND circuit AND1 takes AND of an output signal of the flip-flop circuit FF1 and negative logic of the clock signal CLK, and outputs it to an up signal input terminal Up of the up/down counter 14. Two input terminals of the OR circuit OR1 are connected to the output terminal OUT of the up/down counter 14 and an output terminal (Q) of the flip-flop circuit FF1 respectively, and the OR circuit OR1 outputs a mask control signal MSC, which is obtained by taking OR of both, to a set terminal (S) of the flip-flop circuit FF2.

On the other hand, in the DQS detection circuit 13, while grounding (pulling down) an input terminal through the resistance element R1, the buffer circuit BUF inputs a DQS signal from the RAM 11 and outputs it to a clock input terminal of the flip-flop circuit FF3, and one input terminal of the AND circuit AND2. The flip-flop circuit FF3 connects a D connector to a power source, makes an output signal DET into a high level in a leading edge of the DQS signal, and outputs it to one input terminal of the AND circuit AND3.

The flip-flop circuit FF2 connects an output of the AND circuit AND2 to an own clock input terminal, grounds a D terminal, and outputs a mask signal MS to another input terminal of the AND circuit AND2 from a Q terminal. The AND circuit AND2 connects an own output terminal to a clock input terminal of the flip-flop circuit FF2 and another input terminal of the AND circuit AND3. The AND circuit AND3 outputs a signal DQSIN to the external while connecting an own output to a down signal input terminal Down of the up/down counter 14. A reset signal RST is supplied to a reset terminal (R) of the flip-flop circuits FF1 and FF3.

Figure 2:
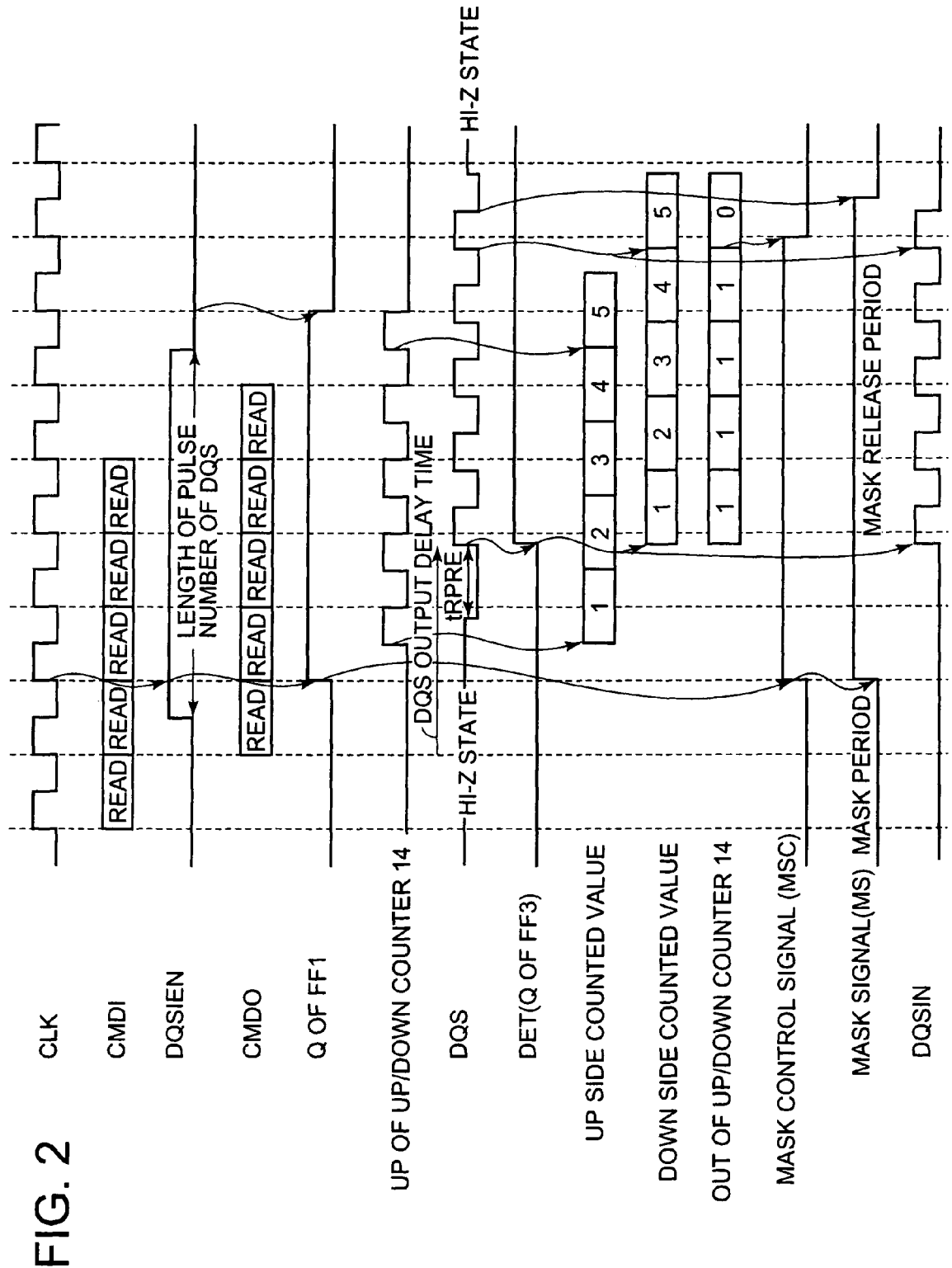
FIG. 2 is a timing chart showing operations of the memory read control circuit according to the first embodiment of the present invention.

FIG. 2 is a timing chart showing operations of the memory read control circuit according to the first embodiment of the present invention. First, it is assumed that the flip-flop circuits FF1 and FF3 are in a reset state with the reset signal RST. In FIG. 2, the command signal CMDI is continuously inputted by five clocks of the clock signal CLK, is delayed by one clock, and is outputted to the RAM 11 as the command signal CMDO. In addition, the signal DSQIEN is inputted, and retiming is performed by the flip-flop circuit FF1 using the clock signal CLK, and it is inputted into the up signal input terminal Up of the up/down counter. At this time, a high level (Hi) zone of the DQSIEN signal expresses a length (5 in the example of FIG. 2) of the pulse number of the DQS signal. Thereby, a counted value in an Up side of the up/down counter 14 increases sequentially as 1, 2, 3, 4, and 5. That is, in FIG. 2, since five read commands continue, the length of the pulse number of the DQS signal is equivalent to five clocks of the clock signal CLK.

The RAM 11 receives the READ command signal CMDO and outputs a DQS signal which has five pulses of level transitions. The DQS detection circuit 13 inputs the DQS signal into the clock input terminal of the flip-flop circuit FF3 through the buffer circuit BUF. The signal DET (Q in the flip-flop circuit FF3) rises to a high level by a rise of a first pulse at the time when the DQS signal rises to a high level after a read preamble time tRPRE. As a result of the signal DET becoming in the high-level, count in a Down side of the up/down counter 14 is enabled. The counted value in the Down side increases as 1, 2, 3, 4, and 5.

An output signal of the AND circuit AND1 is inputted into the Up side of the up/down counter 14, and an output of the AND circuit AND3 is inputted into the Down side. In consequence, the pulse number in the signal DQSIN is subtracted from the counted value of the clock signal CLK in the high-level zone of the signal DQSIEN. Hence, the counted value (OUT) of the up/down counter 14 changes sequentially as 1, 1, 1, 1, and 0.

The mask control signal MSC becomes in a high level while the counted value of the up/down counter 14 is set to 0 after the output (Q) of the flip-flop circuit FF1 rose, and the flip-flop circuit FF2 becomes in a set state. Then, the flip-flop circuit FF2 outputs the high-level mask signal MS showing a mask release period to the AND circuit AND2.

In addition, the DQS signal passes the AND circuit AND2 and AND circuit AND3, and becomes inputtable into an internal circuit as the signal DQSIN. The internal circuit delays timing of the signal DQSIN suitably and latches read data from the RAM 11.

Furthermore, when a last clock of the DQS signal is inputted, and the counted value of the up/down counter 14 is set to 0, that is, the output OUT is set to a low level, the mask control signal MSC is set to a low level, and the set state in the flip-flop circuit FF2 is released. When the flip-flop circuit FF2 detects a last trailing edge of the DQS signal, the mask signal MS is set to a low level showing the mask period. Hence, the output of the AND circuit AND2 changes to the low level, and masking is performed so that the DQS signal may not be outputted to the internal circuit. That is, the signal DQSIN is held in the low level. The mask operation being performed in this way can prevent an unnecessary level transition of the signal DQSIN generated by noise which is superimposed in the high impedance (Hi-Z) state of the DQS signal.

The above memory read control circuits 12 perform the mask operation of the DQS signal using the up/down counter 14 and DQS detection circuit 13. That is, the mask operation is performed on the basis of the counted value of the up/down counter 14 with corresponding to the high impedance (Hi-Z) state of the DQS signal, which prevents a possibility of breakdown of read data at the time of a data fetch in the internal circuit. Since the up/down counter 14 is used at this time, it is possible to set the mask period stably not depending on a transfer mode. Hence, a customized design is not needed but it is possible to use circuitry of giving flexibility.

Embodiment 2

Figure 3:
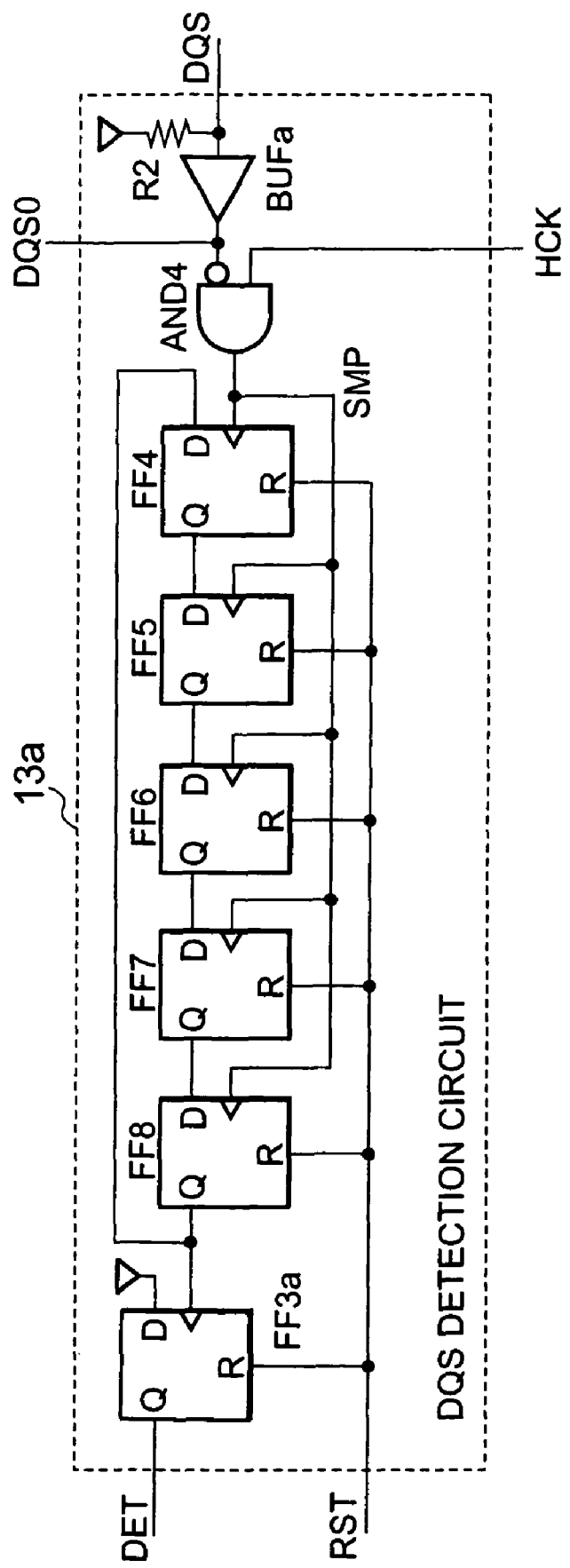
FIG. 3 is a circuit diagram of a DQS detection circuit according to a second embodiment of the present invention.

FIG. 3 is a circuit diagram of a DQS detection circuit according to a second embodiment of the present invention. In FIG. 3, the DQS detection circuit 13 in FIG. 1 is replaced by a DQS detection circuit 13*a*. The DQS detection circuit 13*a* comprises a flip-flop circuit FF3*a* and FF4 to FF8, an AND circuit AND4, a buffer circuit BUFa, and a resistance element R2.

The buffer circuit BUFa inputs the DQS signal and connects an own output terminal to the AND circuit AND4 while connecting (pulling up) an own input terminal to a power source through the resistance element R2. The AND circuit AND4 inputs an inverted signal of the output of the buffer circuit BUFa into one own input terminal, and inputs a high-speed clock signal HCK into another input terminal. In addition, the AND circuit AND4 gives a sampling signal SMP, outputted from an own output terminal to each clock input terminal of the flip-flop circuits FF4 to FF8.

Each D terminal of the flip-flop circuits FF4 to FF8 is connected to each Q terminal of the flip-flop circuit FF8, FF4, FF5, FF6, and FF7, respectively. In addition, the flip-flop circuit FF3*a* connects an own D terminal to the power source, connects an own clock input terminal to a Q terminal of the flip-flop circuit FF8, and outputs the signal DET from an own Q terminal. Furthermore, the reset signal RST is given to each reset terminal (R) of the flip-flop circuits FF3*a*, and FF4 to FF8.

Figure 4:
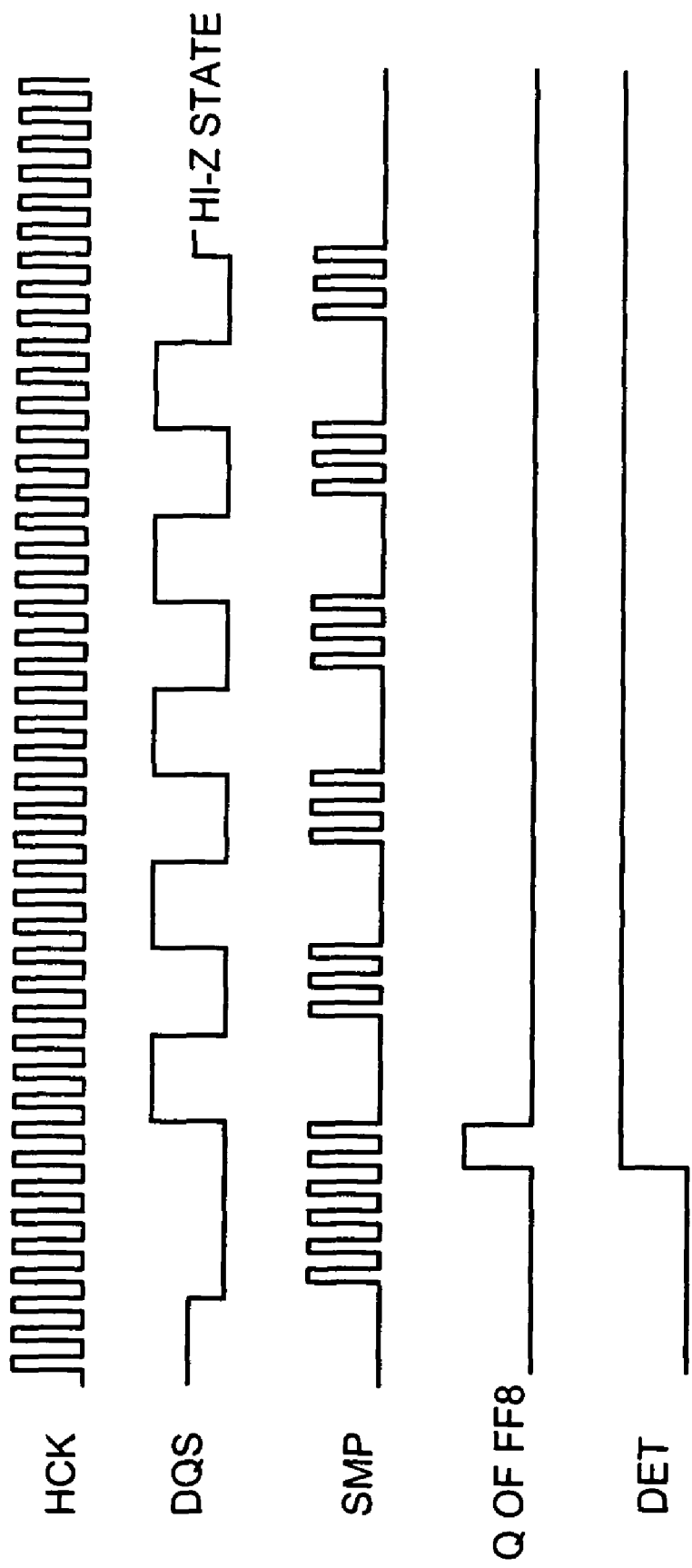
FIG. 4 is a timing chart showing operations of the DQS detection circuit according to the second embodiment of the present invention.

FIG. 4 is a timing chart showing operations of the DQS detection circuit according to a second embodiment of the present invention. Here, a frequency of the high speed clock signal HCK is made into 6 times of a frequency (toggle frequency of the DQS signal) of the clock signal CLK. First, it is assumed that all of the flip-flop circuits FF3*a*, and FF4 to FF8 are in a reset state with the reset signal RST. The AND circuit AND4 samples the low level of the DQS signal with the high speed clock signal HCK, and outputs the sampling signal SMP. The sampling signal SMP is inputted into a counter which is constructed of the flip-flop circuits FF4 to FF8, and the number of sampling is counted. When there is a predetermined sampling number (five in the circuitry of FIG. 3) in a period of the tRPRE which shows a preamble, an output of the flip-flop circuit FF8 becomes in the high level. In consequence, the signal DET which is the output of the flip-flop circuit FF3*a* becomes in a high level, and outputs a high level to the AND circuit AND3 in FIG. 1.

Hereinafter, in completion of the preamble period of the DQS signal, a down counting operation of the up/down counter 14 is performed. Since this operation is the same as described in the first embodiment, its description will be omitted.

According to the DQS detection circuit according to the second embodiment, it is possible to detect stably a preamble period of the DQS signal by counting the clock signal HCK. Hence, a mask operation in the memory read control circuit is performed more stably.

In addition, each disclosure of the above-mentioned patent documents etc. shall be included by citation in this specification. Within the scope of full disclosure (including the scope of the claims) of the present invention, modifications and adjustments of embodiments or examples are further possible on the basis of the fundamental technological idea. In addition, within the scope of the claims of the present invention, combinations with or selections from various disclosure elements are possible. That is, it is needless to say that the present invention includes various modifications and corrections which those skilled in the art can make according to full disclosure, including the scope of the claims, and technical ideas.

What is claimed is:

1. A memory read control circuit, comprising:
   a data strobe detection circuit which detects a preamble of a data strobe signal outputted from memory;
   a mask circuit which makes the data strobe signal maskable with a mask signal; and
   a mask control circuit which inputs information on a data read number relating to a data read request to the memory, decides on the basis of the information on the data read number that the data strobe signal repeated a predetermined number of transitions after the preamble, and performs control to make the mask signal into a masked state,
   wherein the mask control circuit performs control to make the mask signal into a masked state on the basis of the data read number coinciding with an edge number of one side of the data strobe signal corresponding to the data read request.

2. The memory read control circuit according to claim 1, wherein the data read number comprises a read command number.

3. The memory read control circuit according to claim 1, wherein the mask control circuit includes an up/down counter which counts up or counts down the data read number, and counts down or count up the edge number of one side of the data strobe signal corresponding to the data read request, detects coincidence of the data read number with the edge number of the one side, and performs control to make the mask signal into a masked state on the basis of a detection result of the up/down counter.

4. The memory read control circuit according to claim 3, wherein the up/down counter counts up or counts down a clock number in a period, when a signal which expresses a continuation length of the data strobe signal is active, instead of counting up or counting down the data read number.

5. The memory read control circuit according to claim 1, wherein, when the data strobe detection circuit inputs a sampling clock signal and counts a preamble period of the data strobe signal with the sampling clock signal, and a count value becomes a specified value, the data strobe detection circuit starts counting of an edge of one side of the data strobe signal in the mask control circuit.

* * * * *